US010568276B1

(12) United States Patent
Fakhari

(10) Patent No.: US 10,568,276 B1
(45) Date of Patent: Feb. 25, 2020

(54) RAISED-BED PLANTER STRUCTURE

(71) Applicant: ALF Operating Partners, Ltd., Fort Worth, TX (US)

(72) Inventor: M. John Fakhari, Fort Worth, TX (US)

(73) Assignee: ALF Operating Partners, Ltd., Fort Worth, TX (US)

( * ) Notice: Subject to any disclaimer, the term of this patent is extended or adjusted under 35 U.S.C. 154(b) by 453 days.

(21) Appl. No.: 15/337,956

(22) Filed: Oct. 28, 2016

Related U.S. Application Data

(60) Provisional application No. 62/248,885, filed on Oct. 30, 2015.

(51) Int. Cl.
*A01G 9/28* (2018.01)

(52) U.S. Cl.
CPC ..................... *A01G 9/28* (2018.02)

(58) Field of Classification Search
USPC ........ 47/33, 19.1, 65, 65.5, 66.1, 66.3, 32.7; 256/13.1, 12.5, 21, 24, 27; 119/502, 504, 119/512, 513, 514
See application file for complete search history.

(56) References Cited

U.S. PATENT DOCUMENTS

| | | | |
|---|---|---|---|
| 4,016,612 A * | 4/1977 | Barile, Sr. ............ | A47C 19/021 211/182 |
| 4,099,344 A | 7/1978 | Ruemeli | |
| 4,099,815 A | 7/1978 | Cox et al. | |
| 4,237,653 A | 12/1980 | Cortez | |
| 4,303,289 A | 12/1981 | Hardy | |
| 4,429,489 A * | 2/1984 | Fischer ................ | A01G 9/20 47/17 |
| 4,751,792 A | 6/1988 | Robinson | |
| 4,869,018 A | 9/1989 | Scales et al. | |
| 5,291,708 A * | 3/1994 | Johnson ............... | E02D 27/01 52/282.2 |
| 6,434,882 B1 | 8/2002 | Becker | |
| 6,588,732 B1 | 7/2003 | Caceres et al. | |
| D488,401 S | 4/2004 | Gutierrez | |
| 7,322,564 B2 | 1/2008 | Fakhari | |
| 7,810,277 B2 | 10/2010 | Fakhari | |
| D647,767 S | 11/2011 | Greenes et al. | |

(Continued)

FOREIGN PATENT DOCUMENTS

| | | | | |
|---|---|---|---|---|
| CA | 2288583 | * | 7/2000 | ............... A01G 1/08 |
| FR | 2691199 | | 11/1993 | |

(Continued)

*Primary Examiner* — Andrea M Valenti
(74) *Attorney, Agent, or Firm* — Erickson Kernell IP, LLC; Kent R. Erickson

(57) ABSTRACT

A raised-bed planter structure includes a plurality of elongated, horizontally extending bed panels secured to elongated, vertically extending joint members to form a close sided structure open at a top and bottom. Each bed panel includes elongated planar edge flanges joined by a longitudinally extending arched center section. The bed panels are constructed from a fiber reinforced resin and formed using a pultrusion process. The bed panels are secured to the joint members by fasteners which extend through ends of the edge flanges. The assembled planter bed structure is positioned at a desired location in a landscape and filled with soil to receive and support plant life.

10 Claims, 8 Drawing Sheets

(56) References Cited

U.S. PATENT DOCUMENTS

| | | | |
|---|---|---|---|
| 8,354,048 B2 | 1/2013 | Caceres et al. | |
| 8,656,637 B2 * | 2/2014 | Wuster | A01G 9/20 |
| | | | 403/205 |
| 8,931,670 B2 | 1/2015 | Fakhari et al. | |
| 9,149,006 B1 * | 10/2015 | Pope | A01G 9/027 |
| 9,286,813 B2 | 3/2016 | Fakhari et al. | |
| 9,313,956 B2 * | 4/2016 | Volin | A01G 9/28 |
| 9,546,017 B2 * | 1/2017 | Li | F16B 12/22 |
| 2005/0158131 A1 * | 7/2005 | Markusch | C08G 18/10 |
| | | | 405/302.7 |
| 2006/0156626 A1 | 7/2006 | Seaman | |
| 2008/0120905 A1 | 5/2008 | Pai | |
| 2008/0313959 A1 | 12/2008 | Singer | |
| 2009/0277083 A1 | 11/2009 | Barnes | |
| 2010/0186292 A1 | 7/2010 | Hall | |
| 2010/0242357 A1 * | 9/2010 | Vogler | A01G 9/28 |
| | | | 47/33 |
| 2011/0232174 A1 | 9/2011 | Mills | |
| 2011/0252702 A1 | 10/2011 | Gazjuk | |
| 2013/0205663 A1 * | 8/2013 | Topping | A01G 9/20 |
| | | | 47/66.6 |
| 2014/0090228 A1 * | 4/2014 | Chubak | A47B 87/02 |
| | | | 29/428 |
| 2014/0130411 A1 * | 5/2014 | Topping | A01G 9/28 |
| | | | 47/66.1 |
| 2016/0066519 A1 * | 3/2016 | Jansen | A01G 9/28 |
| | | | 47/79 |
| 2016/0238047 A1 * | 8/2016 | Chubak | F16B 5/0614 |

FOREIGN PATENT DOCUMENTS

| | | | | |
|---|---|---|---|---|
| GB | 2133109 A | * | 12/1983 | F16B 2/02 |
| WO | 9534703 | | 12/1995 | |

* cited by examiner

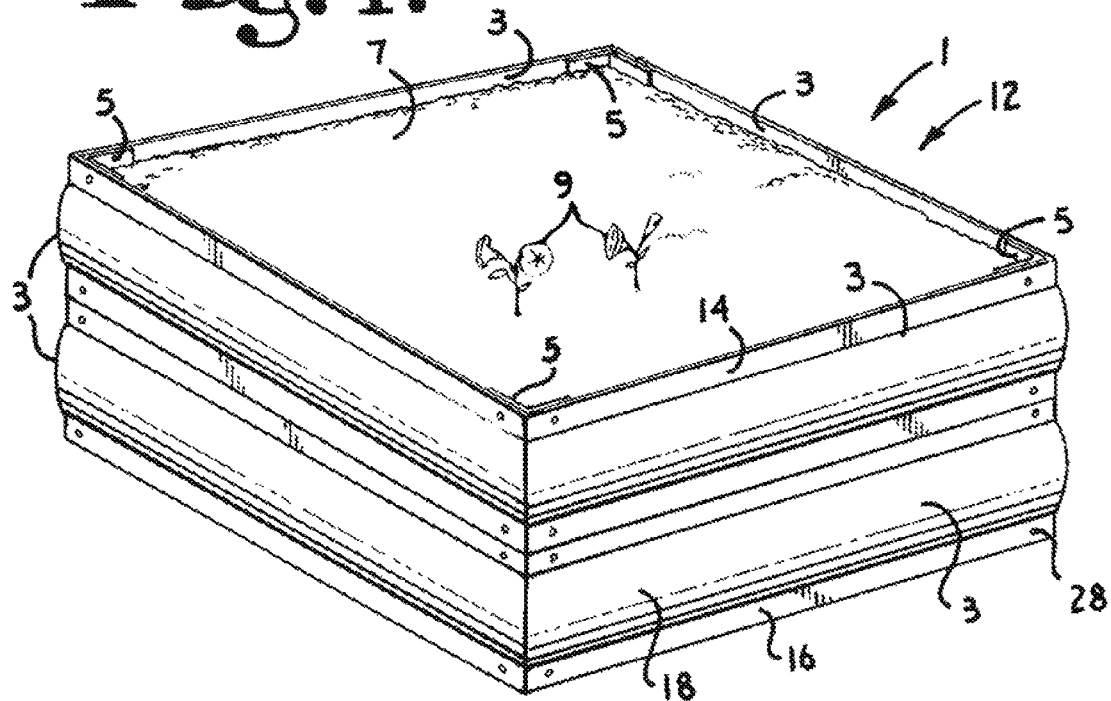
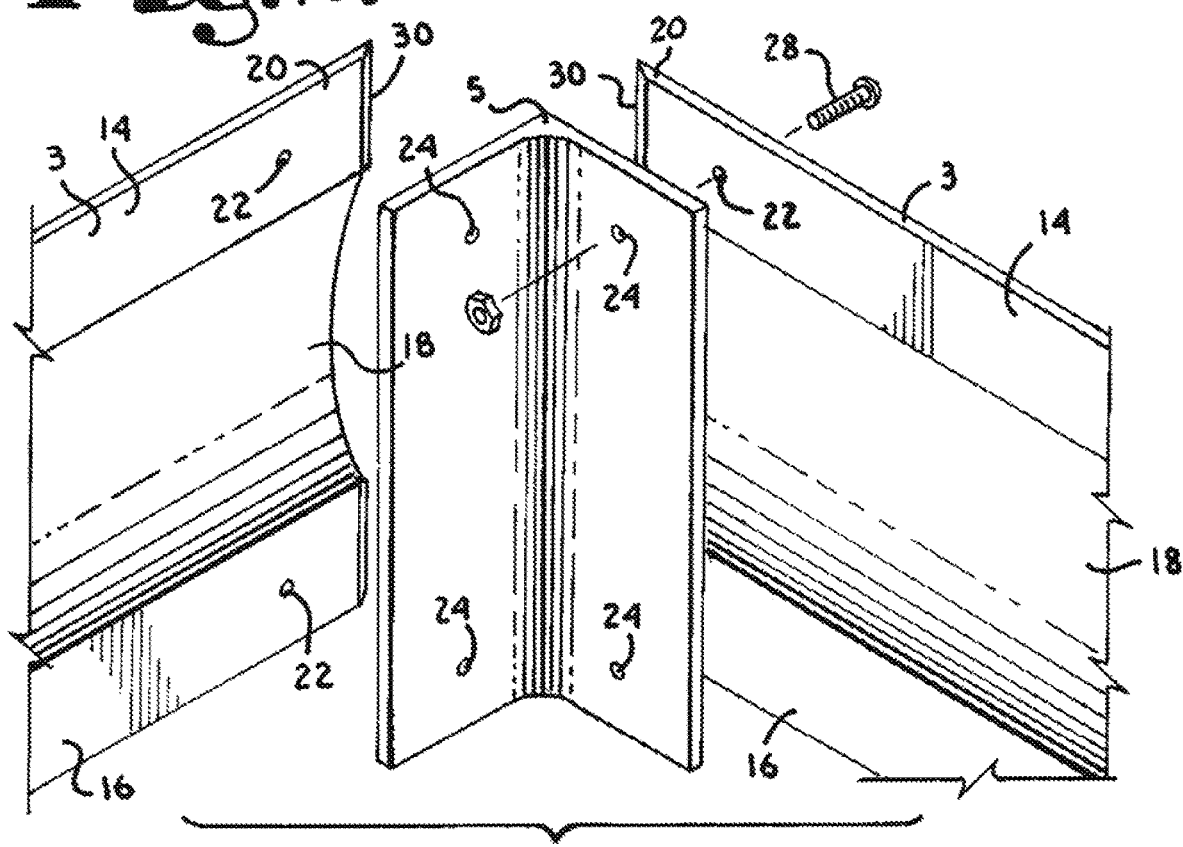

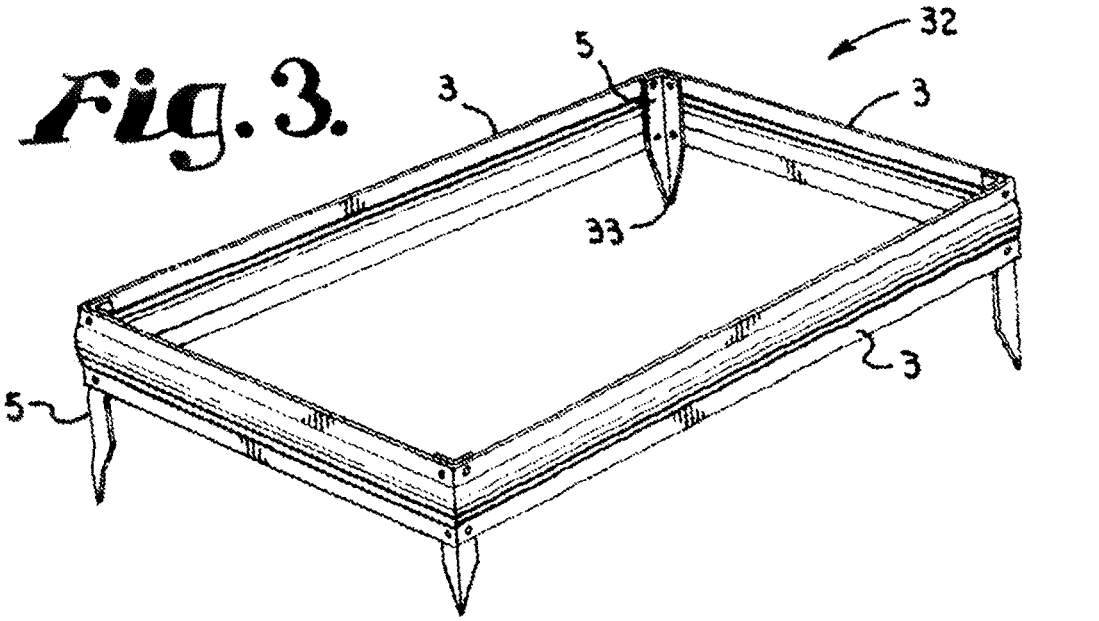
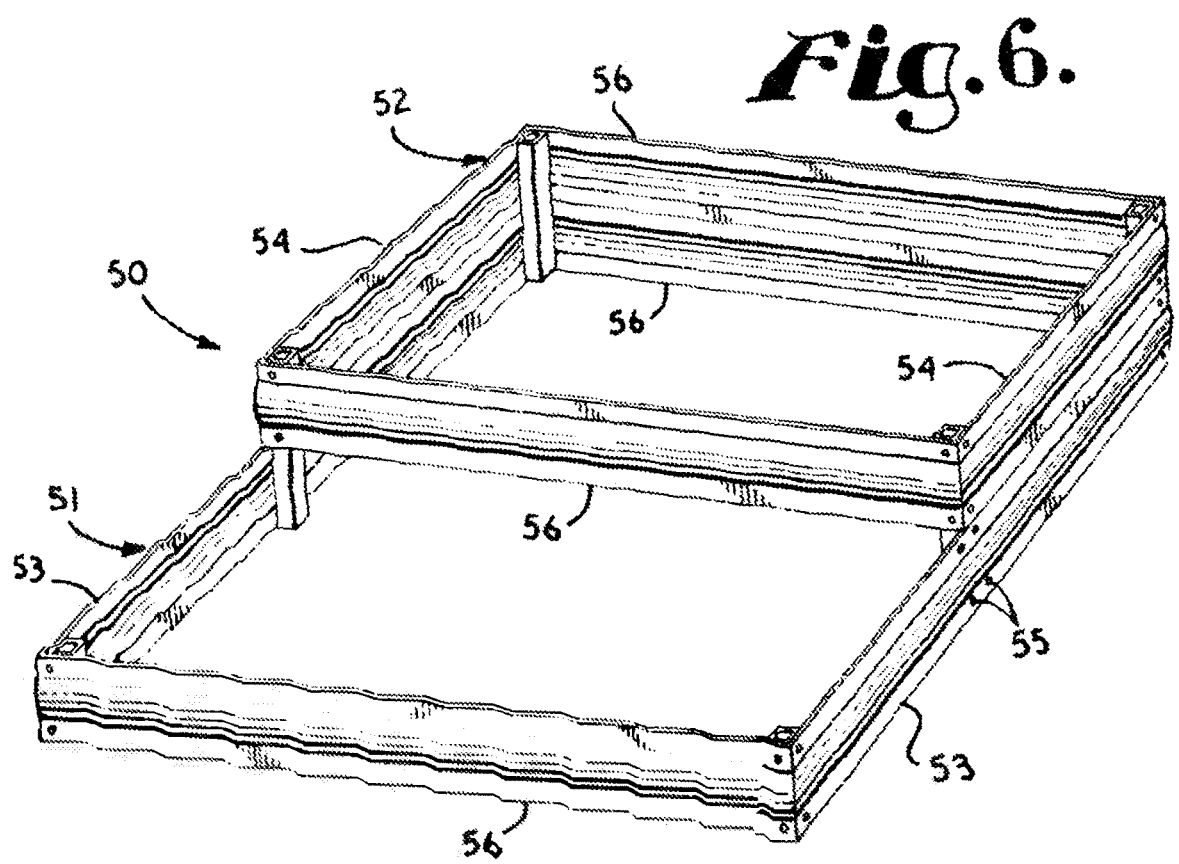

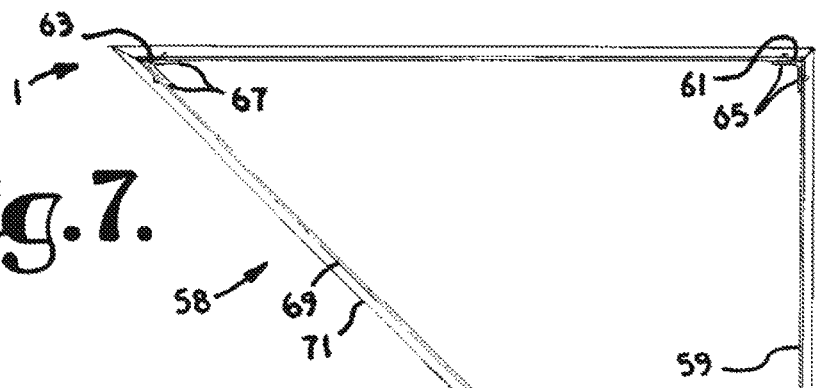
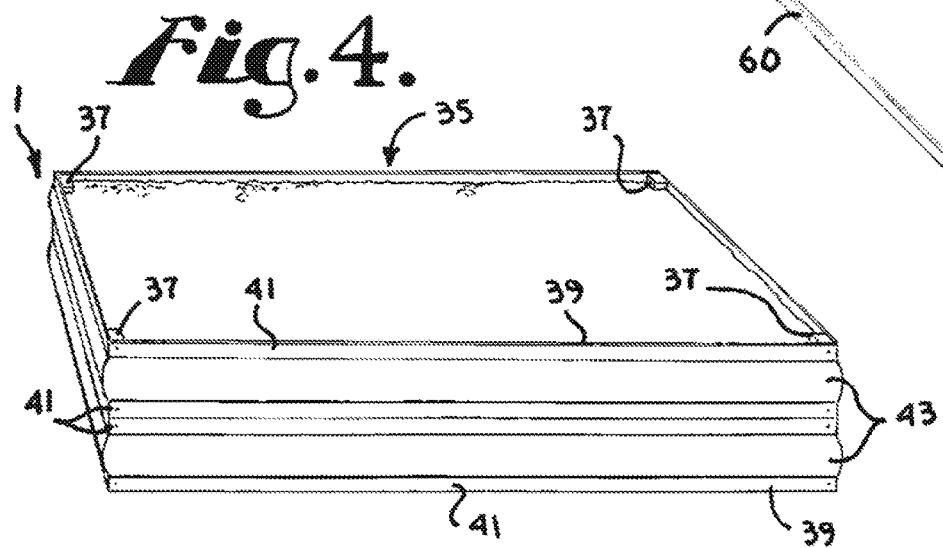
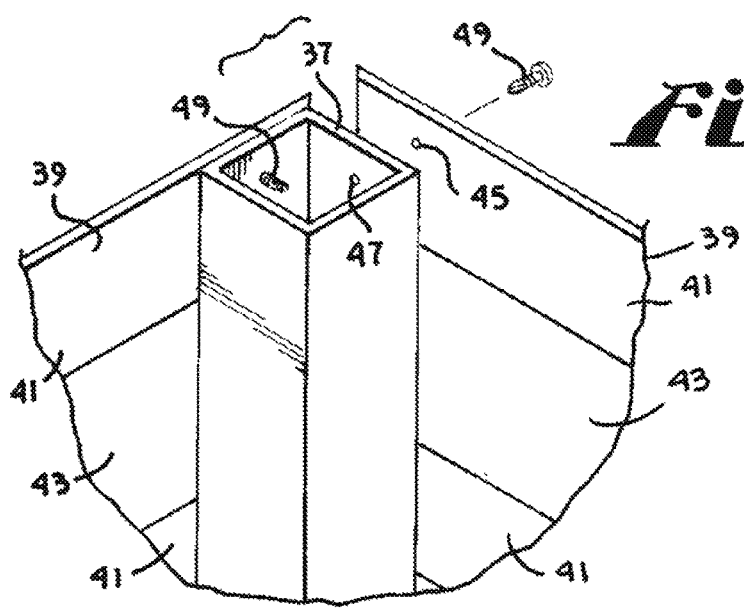

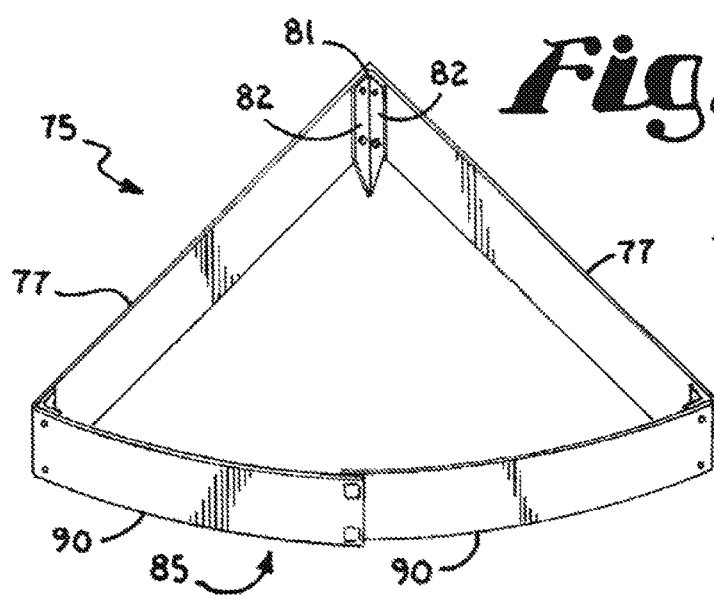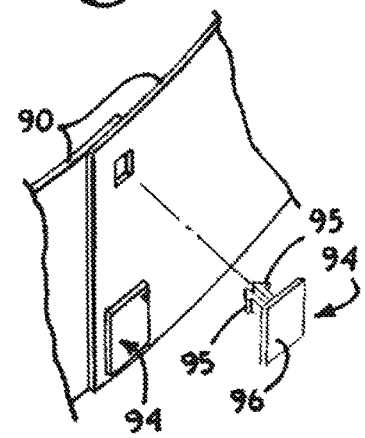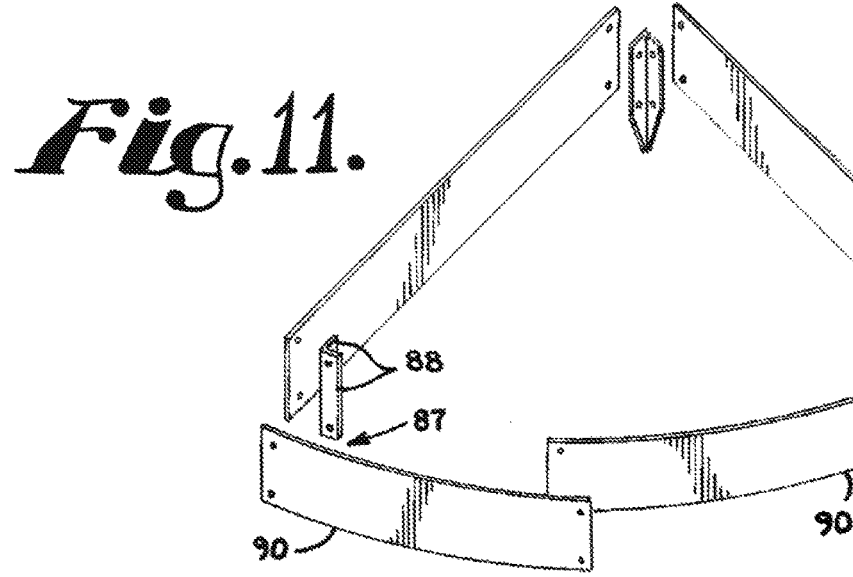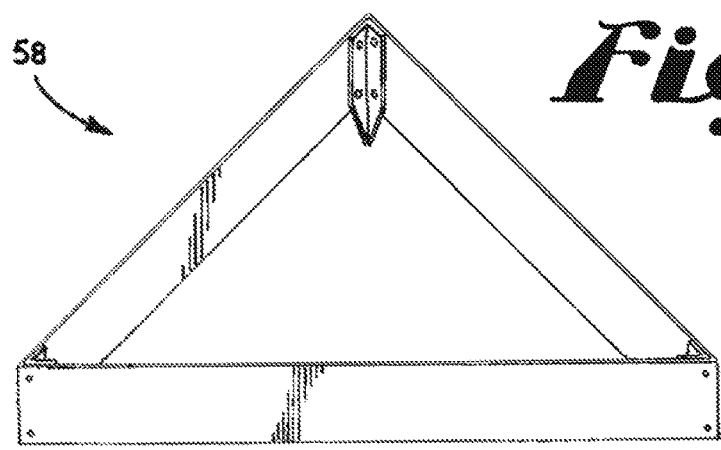

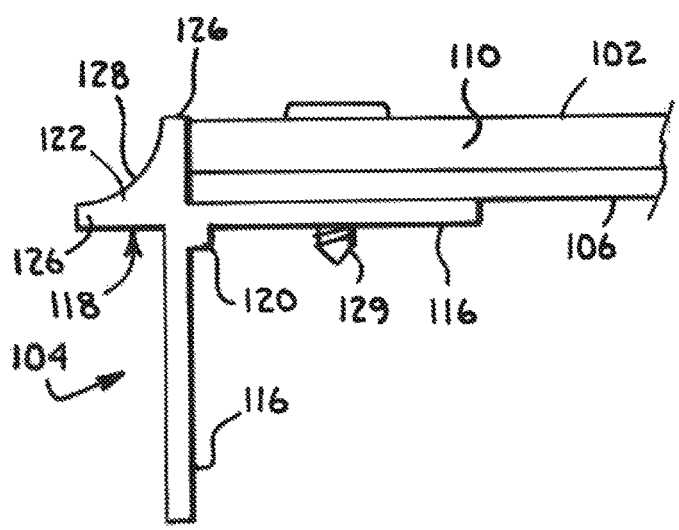
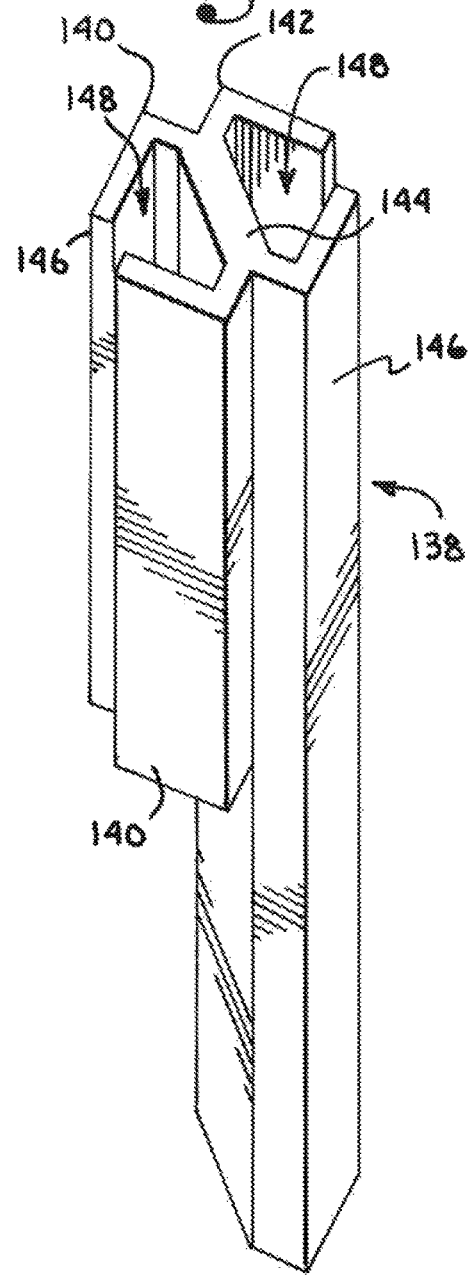
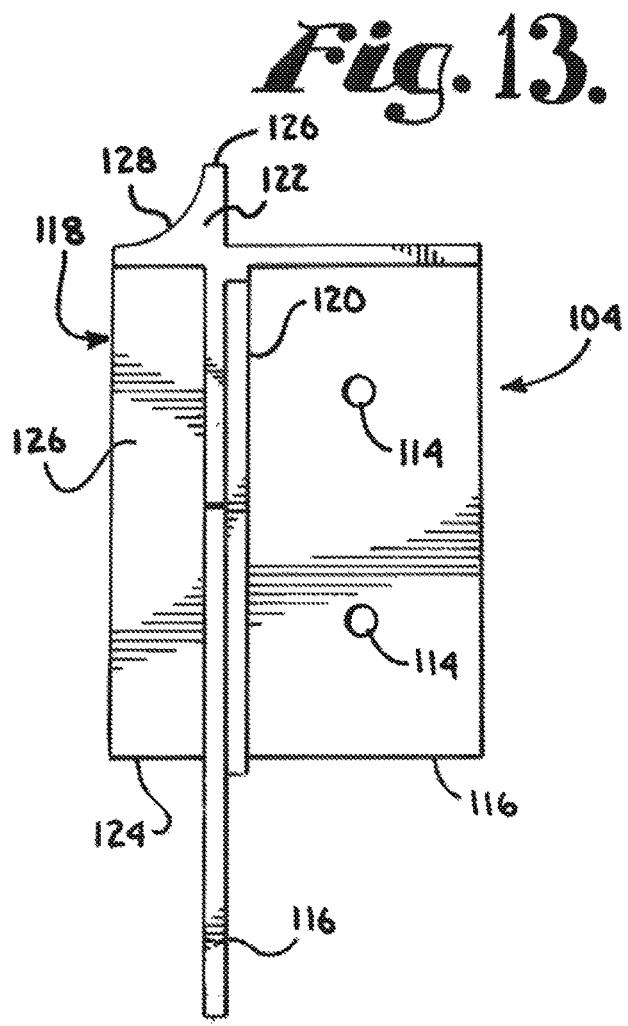

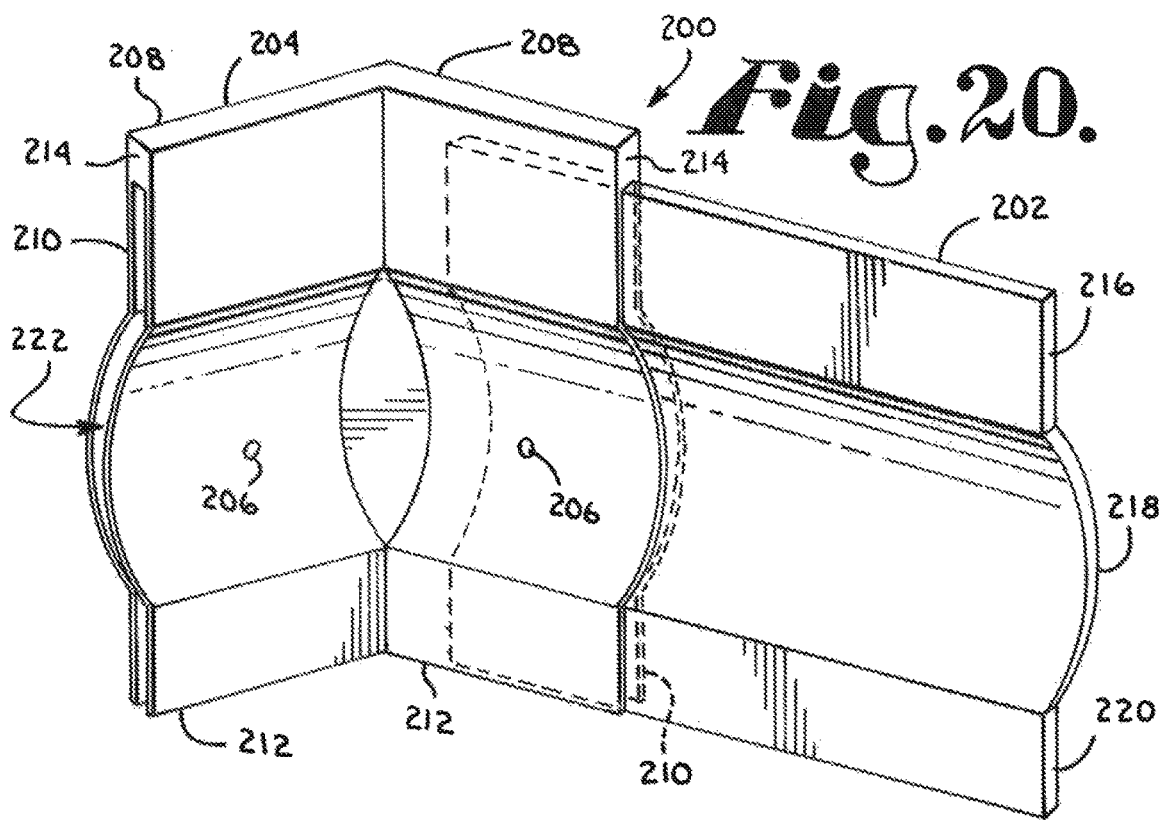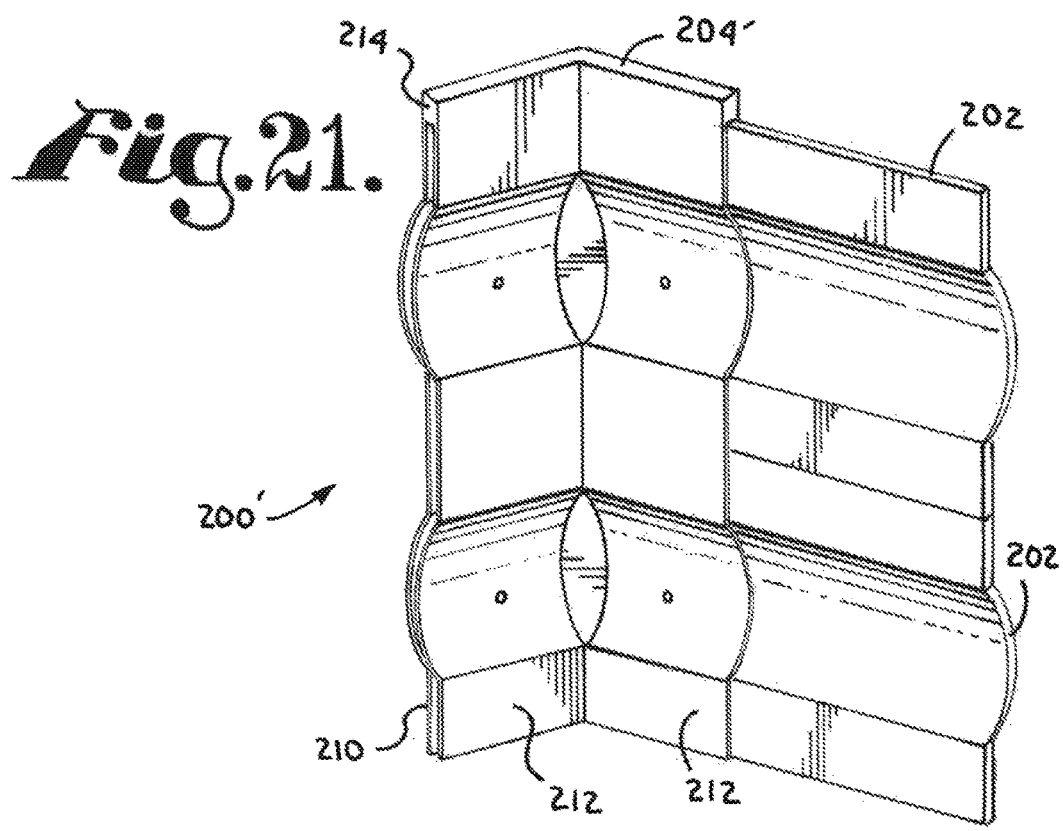

RAISED-BED PLANTER STRUCTURE

CROSS-REFERENCE TO RELATED APPLICATIONS

This application claims the benefit of U.S. Provisional Patent Application No. 62/248,885, filed Oct. 30, 2015 the disclosure of which is hereby incorporated herein in its entirety by reference.

BACKGROUND

In landscaping, planting beds are often formed separate from lawn areas for aesthetic reasons; to organize certain plants, shrubs, trees, and the like; to facilitate watering and maintenance of the grasses, shrubs, flowers, trees, and so forth; and for other reasons. The simplest kinds of beds are areas cleared of grasses, into which flowers, shrubs, or trees are planted. Such areas may also be covered with mulch materials, gravel, or sand. Borders are often formed around planting beds from various kinds of building materials such as stones, bricks, treated wood, poured concrete, or barriers formed of sheet metal, rubber, or various kinds of plastics. The delivery of stones or bricks to a bed and placement around the bed can be quite laborious. Similarly, construction of forms and pouring concrete can require considerable labor, and create a virtually permanent bed. It is sometimes desirable to change the design of a landscape, for example, when a new owner buys a home with existing landscaping that the new owner does particularly care for. In such a situation, it would be desirable for the new owner to be able to conveniently remove existing bed structures to prepare for a new landscaping design.

SUMMARY

Exemplary embodiments are defined by the claims below, not this summary. A high-level overview of various aspects is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, among other things, a raised-bed planter structure formed of elongated bed panels joined by joint or corner members.

Each of the bed panels includes upper and lower flanges which are connected by a longitudinally extending arched or bowed center section. The corner members may be elongated structural members such as angles, tubes with rectangular or circular cross sections, or the like. The ends of the flanges are drilled, as are the corner members, to receive fasteners to secure the ends of the bed panels to the corner members. End edges of the bed panels may be mitered or angled so that the ends of the panels fit flush together at the corners of the bed structure. The planter bed structure may be formed in any suitable shape, such as rectangular, square, triangular, polygonal, or any shape having flat sides. It is also foreseen that the panels could be formed in a curved shape to enable construction of planter bed structures of curved shapes. In all such cases, the cross sectional shape of the joint or corner members is determined by the intended shape of the planter bed structure and the angles at which the bed panels are joined. After assembly, the planter bed structure may be placed at a desired location and filled with soil or other plant medium which will support plants, flowers, shrubbery, trees, or the like.

The planter bed structure may be formed of a single layer of bed panels, or may be two or more layers. In a rectangular embodiment of the planter bed structure, two vertical layers of four bed panels are joined to corner members to form a rectangular shape. The corner members are metal angles, such as of steel. The bed panels are of a fiber reinforced resin composite material which is formed by a pultrusion process. The reinforcing fibers may be glass fibers, carbon fibers, or a combination of fibers. The bed panels may have longitudinal reinforcing fibers, as well as transverse fibers. In some embodiments, the corner members are also comprised of fiber reinforced resin composite materials.

The flanges of the bed panels are planar and are positioned in a common plane, joined by the arched center section. The arched section provides additional stiffness to the bed panels. The bed panels may be colored by pigments within the resin or, alternatively, may be colored externally by paint or other coating. The bed panels are joined to the corner angle members by fasteners, such as bolts and nuts. The assembled planter bed structure may be placed on a ground surface at a desired location and filled with soil or other plant support and growth medium. Various kinds of plants may be planted in the soil or growth medium.

In an alternative embodiment, a rectangular planter bed structure can be formed using square tubular corner members. In another alternative embodiment, a right triangular planter bed structure is formed by three bed panels. Two of the bed panels are joined at a right angle to a right angle member or square tubular corner member. The third bed panel is joined to the right angle joined panels by angle members having flanges joined at a 45° angle. It is foreseen that other configurations of a raised-bed planter structure may be constructed without departing from the scope of the embodiments described herein.

In another embodiment, the corner members are configured to aid vertical stacking thereof. The corner members include a pair of mounting flanges extending at right angles to one another and from a central spine portion. The central spine portion includes vertically facing top and bottom end faces having enlarged dimensions to provide increased surface area upon which overlying corner members can rest when vertically stacked.

In another embodiment, slotted corner members are provided. The slotted corner members include a body having a pair of arms extending at right angles to one another. Each of the arms includes a hollow interior slot sized to enable insertion of an end of a bed panel therein. A fastener can then be inserted through the arm and the end of the bed panel to retain the bed panel in the slot.

DESCRIPTION OF THE DRAWINGS

Illustrative embodiments are described in detail below with reference to the attached drawing figures, and wherein:

FIG. 1 is a perspective view of a double tiered raised-bed planter structure depicted in accordance with an exemplary embodiment;

FIG. 2 is an enlarged fragmentary perspective view of a corner of the structure of FIG. 1 and illustrates joint details of the components of the structure;

FIG. 3 is a perspective view of a single tier raised-bed planter structure depicted in accordance with an exemplary embodiment;

FIG. 4 is a perspective view of a double tiered raised-bed planter structure that incorporates tubular corner members depicted in accordance with an exemplary embodiment;

FIG. 5 is an enlarged fragmentary perspective view of a corner of the structure shown in FIG. 4 and illustrates joint details of the components of the structure;

FIG. 6 is a perspective view of a stepped double tiered raised-bed planter structure depicted in accordance with an exemplary embodiment;

FIG. 7 is a top plan view of an isosceles triangle shaped raised-bed planter structure depicted in accordance with an exemplary embodiment;

FIG. 8 is a perspective view of an equilateral triangle shaped raised-bed planter structure depicted in accordance with an exemplary embodiment;

FIG. 9 is a perspective view of a circle sector shaped raised-bed planter structure depicted in accordance with an exemplary embodiment;

FIG. 10 is an enlarged and fragmentary perspective view of the planter structure shown in FIG. 9;

FIG. 11 is an exploded perspective view of the circle sector shaped raised-bed planter structure as shown in FIG. 9;

FIG. 12 is a top plan view of a corner member of a raised-bed planter structure depicted in accordance with another exemplary embodiment;

FIG. 13 is a side perspective view of the corner member of FIG. 12 looking downward onto the top of the corner member;

FIG. 18 is a side perspective view of a stake/joining member useable with the corner member of FIG. 12 depicted in accordance with an exemplary embodiment;

FIG. 20 is a perspective view of a slotted corner member for a single-tier raised-bed planter structure depicted in accordance with an exemplary embodiment;

FIG. 21 is a perspective view a slotted corner member for a two-tier raised-bed planter structure depicted in accordance with an exemplary embodiment.

DETAILED DESCRIPTION

Figure 19:
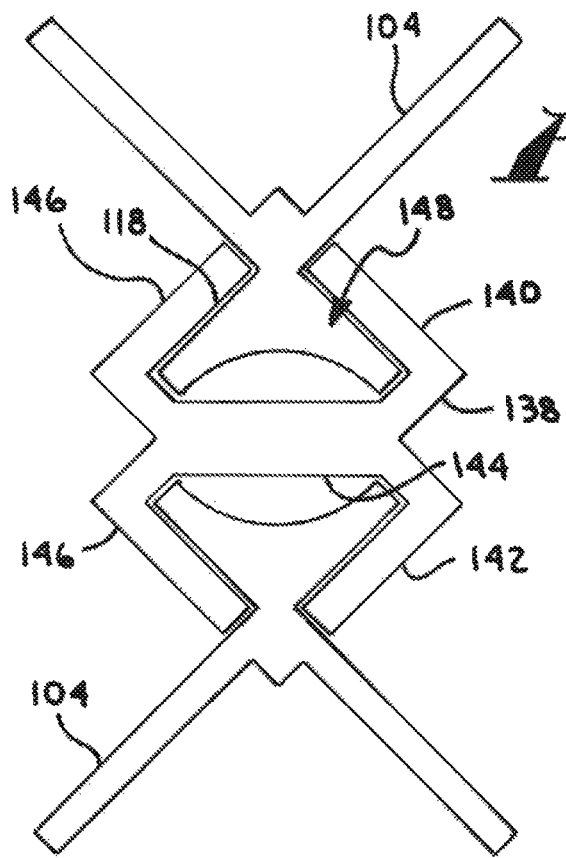
FIG. 19 is a top plan view of the stake/joining member of FIG. 18 depicting a pair of corner members installed therein and depicted in accordance with an exemplary embodiment.

The subject matter of select exemplary embodiments is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value by +/−10%, preferably by +/−5% and/or deviations in the form of changes that are insignificant to the function.

Referring to the drawings in more detail, the reference number 1 generally designates an embodiment of a raised-bed planter structure according to an exemplary embodiment which may be sold as a kit. The structure 1 is formed by a plurality of elongated bed panels 3 joined at their ends to joint or corner members 5 to form a closed structure which is open at the top and bottom. In a typical assembly and installation of the structure 1, the bed panels 23 extend horizontally and the corner members 5 extend vertically. The bed panels 23 may also be described as being securable to the corners so that a longitudinal axis of each panel 23 extends perpendicular to a longitudinal axis of the corner members 5 to which they are connected. The structure 1 provides a framework for containing soil or other plant support and growth medium 7 into which various kinds of plants 9 can be planted.

Referring to FIGS. 1 and 2, a double tiered rectangular embodiment 12 of the raised-bed planter structure 1 is illustrated. The illustrated planter bed structure 12 includes pairs of the bed panels 3 positioned one above the other and joined to the corner members 5, illustrated as angle members. Each of the bed panels includes elongated top and bottom edge flanges 14 and 16 respectively and an elongated arched center section 18 extending between the edge flanges 14 and 16. The illustrated arched center section 18 curves outwardly of the structure 12 and stiffens the bed panels 3. Ends 20 of the bed panels 3 are drilled to provide with apertures 22 which align with apertures 24 in the corner members 5. The corner members 5 are illustrated as angle stock formed by flanges 26 joined at a right angle. The bed panels 3 are secured to the corner members 5 by fasteners 28, such as sets of bolts and nuts. End edges 30 of the illustrated bed panels 3 may be mitered so that the ends 20 of the bed panels fit flush with one another. The edge flanges 14 and 16 of a vertical pair of the bed panels 3 need not be in sealing engagement, since some drainage of the soil 7 within the structure 12 is desirable.

The bed panels 3 may be formed from any suitable material. The illustrated panels 3 are formed of a composite material, such as a fiber reinforced resin. The fibers may be glass fibers, carbon fibers, or a combination of the two. The resin can be an epoxy, a thermosetting resin such as polyester or vinylester, or a thermoplastic. The bed panels 3 are preferably formed by a pultrusion process. Pultrusion is a continuous process for manufacture of composite materials with constant cross-section. Reinforcing fibers are pulled through a resin, possibly followed by a separate preforming system, and into a heated die, where the resin undergoes polymerization. In addition to the longitudinal reinforcing fibers, the process may include the application of layers of transverse fibers to reinforce the product in a transverse direction. Additional information regarding pultrusion process can be found in U.S. Pat. No. 6,588,732 which is incorporated herein by references. The bed panels 3 may be provided in a desired color by incorporation of pigments in the resin or by external coating or painting. The corner members 5 may be formed of a metal such as steel or aluminum or some other alloy or may be formed of a polymer material or fiber reinforced resin similar to that of the bed panels 3.

A square, raised bed planter 1 is assembled by fastening at least four panels 3 of the same length to four joint or corner members 5, such that at least one panel 3 extends between or spans the distance between two corner members 5. For a taller raised bed planter structure 12, as shown in FIG. 1, two or more panels 3 are connected to and between adjacent corner members 5. As shown in FIG. 3, a single tiered planter 1 can be formed by a single layer of the bed panels 3 joined to corner members 5. Referring again to FIG. 3, panels 3 of different lengths can be used for sides of the planter 1 versus ends thereof to produce a non-square, e.g. rectangular planter structure 32.

As shown in FIG. 3, the corner members 5 may be formed as stakes with pointed lower ends 33 extending below a lower edge of the lower most panels 3 for driving into the ground to better hold the planter 1 in place. The corner members or stakes 5 are shown of different lengths to show that the length of the stake 5 extending below the lower edge of the panels 3 may be varied.

The raised-bed planter structure 12 may be assembled at the desired location or assembled elsewhere and moved to the site. Once in place, soil 7, or other medium, is placed within the structure 12, after which various kinds of plant life 9 may be planted in the soil 7. If at a future time removal of the structure 12 is desired, it can be at least partially emptied of the soil 7, disassembled, and moved to another location or disposed of. It is foreseen that a single tiered structure similar to the structure 12 could be formed by a single layer of the bed panels 3 joined to corner members 5 which are sized to accommodate the single layer of bed panels 3.

FIGS. 4 and 5 illustrate a modified embodiment 35 of a raised-bed planter structure 1. The structure 35 is similar in most respects to the bed structure 12. A principal difference is the use of tubular corner members 37 to join pairs of bed panels 39 to form a double tiered rectangular planter bed structure 35. Each of the illustrated bed panels 39 is similar to the bed panels 3 and is formed by planar edge flanges 41 separated by an elongated arched center section 43. The bed panels 39 may be formed of a pultruded, fiber reinforced resin. The illustrated corner members 37 are square cross section tubular metal stock. Ends of the edge flanges 39 are provided with apertures 45 which are aligned with apertures 47 formed in the corner members 37. The aligned sets of apertures 47 and 47 receive fasteners 49 to secure the bed panels 39 to the corner members. The illustrated fasteners 49 are friction-fit fasteners formed of a polymer material, which may be pressed partially into place and seated with a tool such as a mallet. Alternatively, the corner member apertures 47 could be tapped with threads (not shown) to receive fasteners 49 which are similarly threaded. Alternatively, the fasteners 49 could be self-tapping threaded fasteners. The corner members 37 may be formed of a metal such as steel or aluminum or some other alloy or may be formed of a polymer material including fiberglass reinforced polymer and may be formed using a pultrusion process.

FIG. 6 illustrates a planter assembly 1 in which various sized panels 3 have been assembled in a two-tiered rectangular configuration 50 with a longer lower level or tier 51 and a shorter upper tier 52. The side panels 53 of the lower tier 51 are longer than the side panels 54 of the upper tier 52 and preferably twice as long. Two pairs of vertically and horizontally aligned fastener receiving apertures 55 are formed in the lower tier side panels 53 generally medially thereof for receiving fasteners for connecting corner members, such as tubular corner members 37 thereto. Different pairs of vertically aligned fastener receiving apertures 55 are used depending on which half of the lower tier side panels 53 the upper tier side panels 54 are positioned over. The end panels 56 of the lower and upper tiers 51 and 52 are of the same length and are shown as longer than the upper tier side panels 54 but shorter than the lower tier side panels 53. It is to be understood that the length of the end panels 56 can vary widely, but may be of the same length as either the lower or upper tier side panels 53 or 54 to reduce the number of different length panels that have to be manufactured and supplied.

FIG. 7 illustrates an alternative embodiment of the raised-bed planter structure 1 in the form of a triangular planter bed structure 58. The illustrated structure 58 is an isosceles right triangle formed by side bed panel members 59 and a diagonal bed panel member 60 joined by corner members 61 and 63. The diagonal bed panel member 60 forms a hypotenuse of the right triangle and is joined at 45° angles to the side bed members 59. The illustrated corner member 61 is formed by an angle member having flanges 65 joined at 90°. The corner members 63 are formed by angle members having flanges 67 joined at 45°. The bed panels 59 and 60 are preferably formed in a manner similar to the bed panels 3 and 39 and include edge flanges 69 connected by a center arch section 71. The bed panels 59 and 60 may be formed of a pultruded, fiber reinforced resin.

The structure 58 can be formed as a single tier structure or as a multiple tier structure. In most respects, the structure 58 can be used in a manner similar to the structures 12 and 35. The illustrated triangular bed structure 58 may find particular utility when positioned in a corner of a landscape, such as at a corner of a fence. The corner members 61 and 63 may be formed of a metal such as steel or aluminum or some other alloy or may be formed of a polymer material. While the illustrated triangular bed structure 58 is shown as an isosceles right triangle in FIG. 7, the structure 58 could alternatively be of other triangular shapes, such as an equilateral triangle with three 60° corners as generally shown in FIG. 8.

FIGS. 9-11 show a further variation 75 of the planter assembly 1 generally in the shape of a circle sector or pie piece. Two side panels 77 are connected together at first ends thereof by a first corner member or stake 81 having mounting flanges 82 extending at a right angle or ninety degrees relative to each other. A curved or arcuate panel assembly 85 is connected to and extends between second ends of the side panels 77. The arcuate panel assembly 85 is connected to the side panels by corner connectors 87 having mounting flanges 88 projecting at an obtuse angle relative to each other such as an angle of approximately one hundred and twenty degrees or one hundred and thirty five degrees.

The arcuate panel assembly 85 shown is formed from two flexible, elongate rectangular strips 90 which are fastened together at overlapping or abutting ends. The side panels 77 shown may be constructed similar to panels 3 with a bowed center which provides rigidity and resists bending of the panel. The flexible strips 90 of the arcuate panel assembly, are preferably formed with sufficient flexibility to allow the panels to bend or curve. When formed from metal or pultruded fiberglass, the strips 90 are preferably formed flat, e.g. without the arched center section 18, to facilitate flexing or bending of the strips 90. In the arcuate panel assembly 85 shown, a pair of vertically aligned square receivers 92 are formed in each strip proximate its inner end, which is the end to be connected to the other strip 90 forming the assembly 85. Clips 94 with barbed, flexible legs 95 and an enlarged head 96 are inserted through aligned receivers 92 of overlapping ends of the strips 90 forming the arcuate panel assembly 85 to secure or hold the strips 90 together. It is foreseen that the arcuate panel assembly could be formed as a single curved panel. It is also foreseen that the arcuate panel assembly could be pre-formed as a rigid, fixed curve assembly. As with the triangular assemblies 58 shown in FIGS. 7 and 8, the circle sector assembly 75 is particularly well adapted for placement in corners of landscape designs such as at the corner of fences.

It is foreseen that the corner members 5, 37, 61, and 63 could alternatively have solid cross sections, and be made of a material such as wood, a weatherproof treated wood, a polymer, or a material such as polymer shell filled with a structural foam polymer. It is also foreseen that in addition to corner members at corners of the bed structures 1, the bed structures could also have vertical panel support members (not shown) positioned between adjacent sets of corner members. It is foreseen that the joint members can be of lengths to be flush with external edges of the associated bed panels. Alternatively, the corner members could extend above the bed panels to receive decorative structures. The corner members could alternatively extend below the bed panels and be driven into the ground to anchor the bed structures 1, although the mass of soil 7 within a bed structure should be sufficient to effectively anchor the position of the bed structure. It is also foreseen that planter bed structures 1 could be formed in straight sided figures other than those shown and also in curved sided figures with appropriate modifications and that corners therefore could be formed at a wide variety of angles using correspondingly angled corner members such as the angle members 5.

With reference now to FIGS. 12-15, a raised-bed planter structure 100 is described in accordance with another exemplary embodiment. The structure 100, like the structures 1, 35 and 55 describe previously, includes bed panels 102 and corner members 104 that can be coupled together to form rectangular, square, or triangular shaped structures, among other shapes with linear and/or curved sides. The bed panels 102 are formed from fiber reinforced resin composite materials as described above. The corner members 104 may also be formed from a fiber reinforced composite material which may be the same or different than that of the bed panels 102. The corner members 104 might also be formed from other materials including metals or polymers as described above.

The bed panels 102 are configured like those described above to include a top and a bottom flange 106, 108 and an arched center section 110. The top and bottom flanges 106, 108 lie in substantially the same plane and the arched center section 110 extends a distance outwardly or transversely from that plane, as shown in FIG. 12. The top and bottom flanges 106, 108 are provided with apertures 112 disposed adjacent each end thereof and arranged to align with corresponding apertures 114 formed in the corner members 104.

As shown in FIG. 12, the corner members 104 include a pair of flanges 116 extending from a vertically aligned central body or spine 118. The flanges 116 are shown extending perpendicularly to one another to form a right angle corner, however it is understood that other arrangements may be provided to form corners with other angular configurations. The apertures 114 are formed in each of the flanges 116 and are positioned thereon to align with the apertures 112 in the bed panels 102.

An interior ridge 120 is formed between the flanges 116 to extend vertically along the interior of the corner formed by the flanges 116. The interior ridge 120 may aid to strengthen the corner member 104 against cracking or breaking along the junction between the flanges 116. The ridge 120 also increases the surface area of a top and bottom face 122, 124 of the corner member 104 to aid in vertically stacking the corner members 104 as described more fully below.

The spine 118 forms the outside of a corner of the structure 100 and is comprised of a body having a pair of legs 126 extending generally perpendicularly to one another and opposite the flanges 116. An arcuate wall 128 extends between distal ends of the legs 126 and is concave inward into the corner member 104. Each of the legs 126 generally aligns with a respective one of the flanges 116 and lies in a common plane therewith. The legs 126 extend a distance beyond the exterior faces of the adjacent flanges 116 a distance equal to or just greater than that of the arched center section 110 of the bed panels 102 when disposed against the respective flanges 116.

Figure 16:
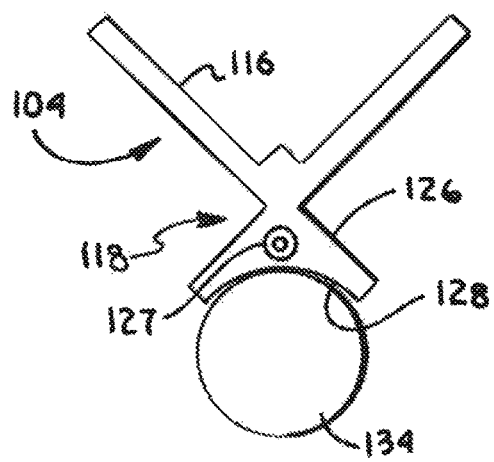
FIG. 16 is a top plan view of the corner member of FIG. 12 with a stake disposed along a spine thereof to aid retention of the corner member in an installed position depicted in accordance with an exemplary embodiment.

The legs 126 and arcuate wall 128 together increase the surface area of the top and bottom faces 122, 124 of the corner member 104 to aid vertical stacking thereof as described more fully below. In one embodiment, the top and bottom faces 122, 124 are provided with mating features that aid to interlock vertically stacked corner members against relative horizontal and/or vertical movement. For example, as shown in FIG. 16, a nub 127 or tab may be provided on the top face 122 and a mating indentation (not shown) configured to receive the nub may be provided on the bottom face 124.

Figure 14:
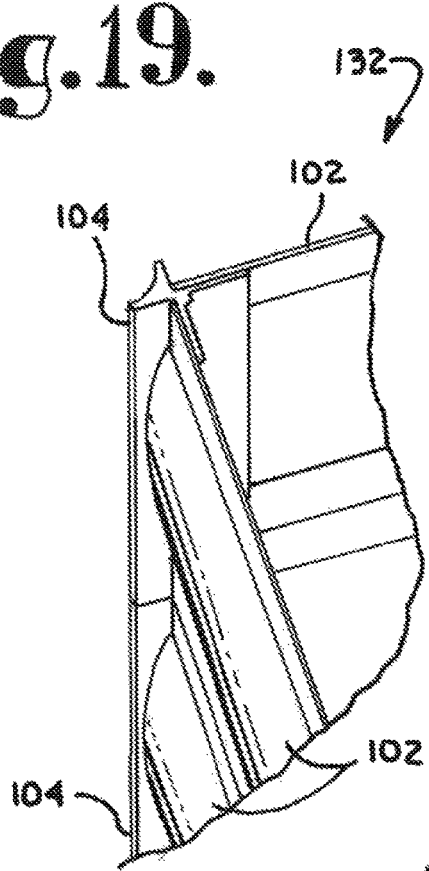
FIG. 14 is an enlarged partial perspective view of a two-tiered raised-bed planter structure employing the corner member of FIG. 12 in accordance with an exemplary embodiment.
Figure 15:
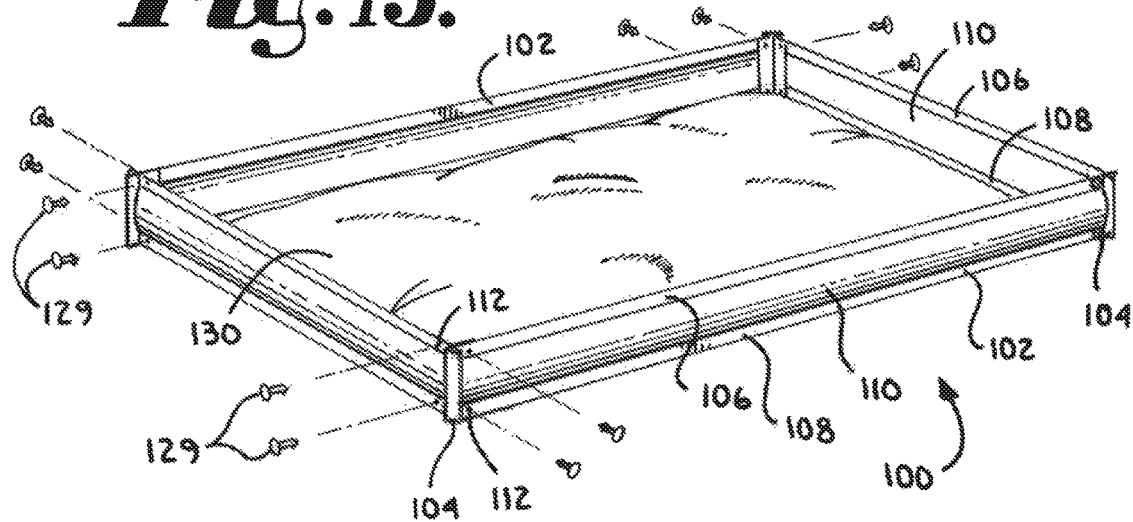
FIG. 15 is a perspective view of a single-tier raised-bed planter structure constructed using the corner member of FIG. 12 in accordance with an exemplary embodiment.

As shown in FIGS. 14 and 15, the structure 100 can be constructed by aligning ends of the bed panels 102 to overlap the flanges 116 of the corner members 104 such that the end of the bed panel 102 abuts a respective leg 126 and the apertures 112 and 114 are aligned. Fasteners 129, such as push-rivets, screws, bolts and nuts, or the like are installed through the apertures 112, 114. This process is completed for each of the sides of the structure 100.

As shown in FIG. 15, a fabric liner 130 may be placed within the structure 100. The fabric liner 130 may comprise a geotextile material configured to retain soil or other growth medium within the structure 100 but to allow moisture to drain from the structure 100. The liner 130 might also be configured to retain moisture when such a characteristic is desired.

FIG. 14 depicts two sets of bed panels 102 and corner members 104 assembled and vertically stacked upon one another to form a two-tier raised-bed structure 132. The additional surface area provided to the top and bottom faces 122, 124 of the corner members 104 by the spine 118 and interior ridge 120 provide additional support area between the stacked structures 100. In another embodiment, the corner members 104 have a height sufficient to receive a plurality of bed panels 102 in a vertically stacked orientation, e.g. the corner members 104 have a height sufficient to form a multi-tiered structure 100 without stacking a plurality of corner members 104 atop one another.

As depicted in FIG. 16, a stake 134, rod, or similar component may be employed to retain the structure 100, 132 in a desired location. The stake 134 is configured to be at least partially driven into an underlying surface and may include an outer profile that can be accommodated by the arcuate wall 128 of the spine 118 of the corner member 104. As such, the arcuate wall 128 may at least partially engage the stake 134 to resist relative lateral movements therebetween. Placing stakes 134 to engage a plurality of the corner members 104 of the structure 100, 132 should be sufficient to resist movement of the structure 100, 132.

Figure 17:
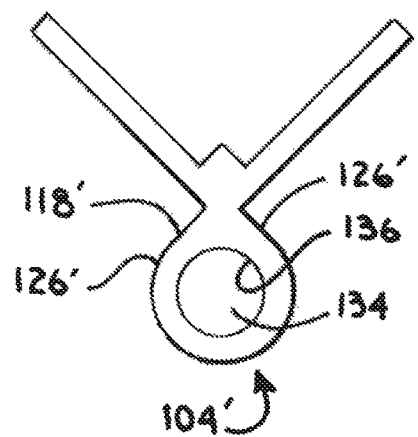
FIG. 17 is a top plan view of a corner member for a raised-bed planter structure in which the corner member includes a bore along a spine thereof in which a stake is installed to retain the corner member in an installed position depicted in accordance with an exemplary embodiment.

In another embodiment depicted in FIG. 17, a spine 118' of a corner member 104' may be configured such that legs 126' extend along an arcuate path to join together and form a bore 136 extending through the spine 118'. The bore 136 thus provides a location into which the stake 134 can be inserted and at least partially driven into an underlying surface. The stake 134 may also have sufficient length to extend between vertically stacked corner members 104'. As such, the stake 134 can aid to resist relative movements between the vertically stacked corner members 104'.

In another embodiment, a stake 138 is provided that is configured to engage the spine 118 of the corner member 104. As shown in FIG. 18, the stake 138 includes a first slotted body 140 and a second slotted body 142 that is longer than the first slotted body 140. The first and second slotted bodies 140, 142 are joined along a common wall 144 and have mirroring cross-sectional profiles. Each body 140, 142 includes a pair of opposing longitudinal walls 146 that extend from opposing edges of the common wall 144 to form a generally right triangular hollow 148 therebetween. Distal ends of the walls 146 remain spaced apart to leave the triangular hollow 148 open along one vertex thereof. The hollow 148 and the spacing between the distal ends of the walls 146 are configured to receive the spine 118 of the corner member 104 therein by aligning the spine 118 with the hollow 148 and moving the spine 118 into the hollow 148 along a longitudinally extending path.

Accordingly, the first slotted body 140 can be engaged with the corner member 104 while the second, longer, slotted body 142 can be at least partially driven into an underlying surface to anchor the corner member 104 to the underlying surface. A second corner member 104 might also be installed in the second slotted body 142 to couple two corner members 104 together, spine-to-spine, as shown in FIG. 19. In another embodiment, the second slotted body 142 is the same length as the first slotted body 140 and is useable without driving into an underlying surface.

With reference now to FIG. 20, a raised-bed planter structure 200 is described in accordance with another exemplary embodiment. The structure 200 is comprised of bed panels 202 configured like the bed panels 3, 39, 57, and 102 described previously and are thus not described in further detail here. The structure 200 also includes corner members 204 that couple to ends of the bed panels 202 to retain the bed panels 202 at right angles to one another or at another angle defined by the corner members 204. Apertures 206 may be provided through the corner members 204 and the bed panels 202 through which fasteners (not shown) may be installed to retain the bed panels 202 in engagement with the corner members 204.

The corner members 204 include a pair of intersecting side members 208 joined along one edge thereof and perpendicularly to one another; the side members 208 may be joined at another angle as desired to provide the structure 200 with various polygonal forms. Each side member 208 comprises a hollow body formed by an exterior wall 210, an interior wall 212, and a top wall 214. The exterior and interior walls 210, 212 extend downwardly from the top wall 214 a distance generally equal to or just greater than the height of the bed panels 202 and are formed with a profile mimicking that of the bed panels 202, e.g. the exterior and interior walls 210, 212 mimic the profile of a top flange 216, an arched center section 218, and a bottom flange 220 of the bed panels 202. A bottom wall (not shown) may be provided to extend between the bottom edges of the exterior and interior walls 210, 212, but is not required.

The exterior wall 210, the interior wall 212, and the top wall 214 together form a slot 222 into which an end of the bed panel 202 may be inserted. A vertically extending interior wall (not shown) or other feature may be provided interior to the slots 222 and at or near the junction between the side members 208 of the corner member 204. The interior wall may provide a stop against which the bed panels 202 may be abutted during installation into the slot 222, or the interior wall may provide additional strength or structural stability to the exterior and interior walls 210, 212.

As depicted in FIG. 21, the corner members 204 can be configured as a two-tiered corner member 204' by extending the exterior and interior walls 210, 212 a distance sufficient to accommodate two vertically stacked bed panels 202. The corner members 204 may be further extended to accommodate a desired number of vertically stacked bed panels 202.

Figure 22:
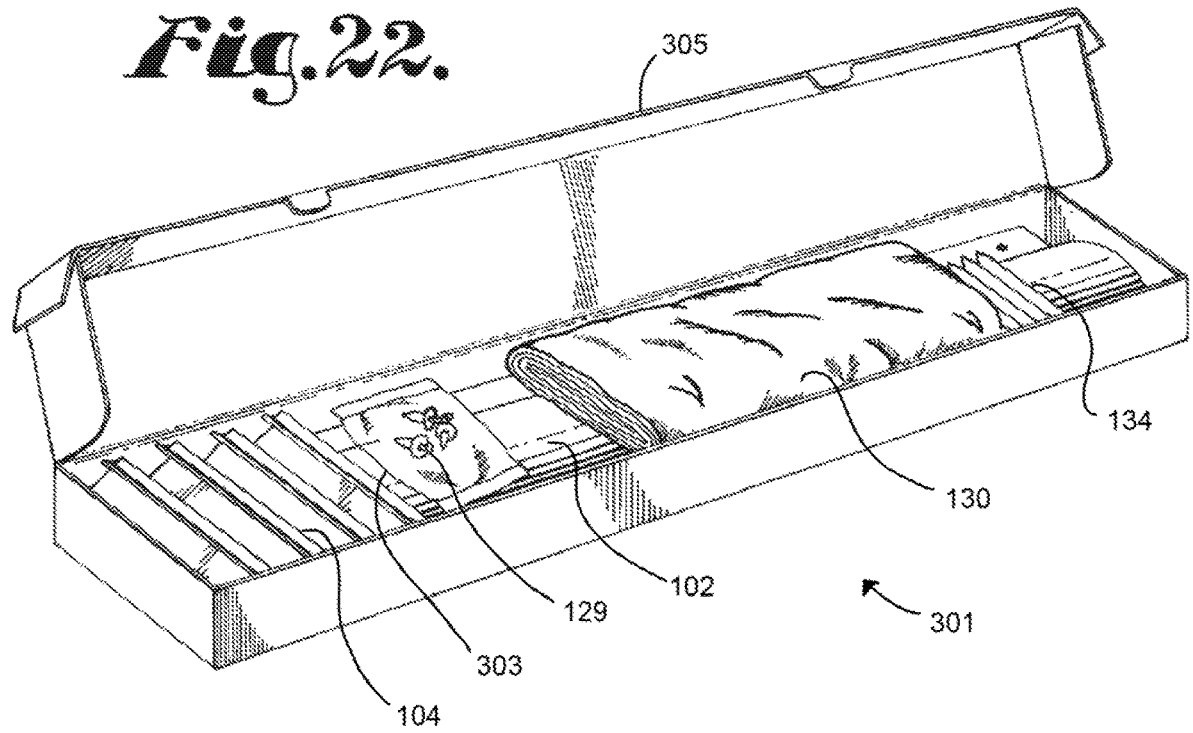
FIG. 22 is perspective view of a raised-bed planter kit depicted in accordance with and exemplary embodiment.

Referring to FIG. 22, the components of a raised bed planter structure such as the structure 104 shown in FIGS. 12-15 can be sold as a kit 301. The kit 301 includes a plurality of panels 102, a plurality of corner members 104, a plurality of stakes 134, a fabric liner 130 and a package 303 containing a plurality of push rivets 129 all packaged together in a box 305. In the embodiment shown in FIG. 2, the kit 301 includes four panels 102, four corner members 104, four stakes 134, one fabric liner 130 and at least sixteen push rivets 129 for assembling a single, square, layer of a raised bed planter structure 100. It is to be understood that a wide variety of the panels, corner members, stakes, fabric liners and fasteners may be included in the kit 301 to form a wide variety of shapes, sizes and configurations of planter structures.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A kit for assembling a raised-bed planter structure comprising: a plurality of joint members, each joint member including a pair of vertically extending planar mounting flanges and an integral spine extending vertically along the full length of an intersection of the mounting flanges, the mounting flanges intersecting perpendicularly to form a corner and the spine extending outwardly from an exterior side of the corner, the spine including a first planar leg in a first vertical plane and a second planar leg in a second vertical plane that perpendicularly intersects the first plane at a junction between the first and second mounting flanges and the first and second legs, and the spine including an inwardly concave arcuate surface, the surface being open-faced and directed outwardly from the exterior side of the corner and that extends between vertical free edges of the first and second legs and continuously along the vertical length of the spine; and a plurality of elongated panels, the panels being securable between the joint members in such a manner as to form a closed sided planter structure that is open at a top and a bottom, with ends of the panels overlapping with and coupling to a respective one of the mounting flanges, and wherein the closed sided planter structure is configured to be disposed on a ground surface and filled with a plant support and growth medium.

2. The kit of claim 1, wherein at least some of the panels further comprise:
 elongated, substantially planar top and bottom panel flanges positioned in parallel spaced relation; and
 a longitudinally extending arched center section connecting the top and bottom panel flanges.

3. The kit of claim 2, wherein the arched center section of at least some of the panels curves outwardly a first distance and the spine extends outwardly from the joint member a second distance, and wherein the first distance is one of equal to or just less than the second distance.

4. The kit of claim 2, wherein the top and bottom panel flanges are positioned in a common plane.

5. The kit of claim 1, further comprising a plurality of fasteners and wherein the mounting flanges include a first aperture, the ends of the panels include a second aperture, and wherein the first and second apertures are alignable to receive one of the fasteners.

6. The kit of claim 5, wherein at least some of the fasteners comprise push-rivets.

7. The kit of claim 1, further comprising a plurality of stakes, each stake installed to extend parallel to the spine of one of the joint members and to engage the arcuate surface thereof, engagement between the stake and the arcuate surface resisting relative lateral movement between the joint member and the stake.

8. The kit of claim 1, wherein at least some of the spines provide a top face and a bottom face, the top face providing a support surface for a second joint member of a second similarly configured structure.

9. The kit of claim 1, wherein, in at least some of the joint members, the mounting flanges intersect at an angle to form a corner, the spine extends along an outside of the corner and an integral interior ridge extends along a full vertical length of an interior of the corner and from a junction between the mounting flanges.

10. The kit of claim 1, further comprising:
 a fabric liner comprised of a geotextile.

\* \* \* \* \*